(12) United States Patent
Jeong et al.

(10) Patent No.: US 12,223,185 B2
(45) Date of Patent: Feb. 11, 2025

(54) ELECTRONIC DEVICE AND METHOD FOR MANAGING MEMORY OF ELECTRONIC DEVICE

(71) Applicant: SAMSUNG ELECTRONICS CO., LTD., Suwon-si (KR)

(72) Inventors: Kwanhee Jeong, Suwon-si (KR); Sekyeong Heo, Suwon-si (KR); Hyojong Kim, Suwon-si (KR); Donggyu Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 18/191,423

(22) Filed: Mar. 28, 2023

(65) Prior Publication Data
US 2023/0236744 A1 Jul. 27, 2023

Related U.S. Application Data

(63) Continuation of application No. PCT/KR2021/002226, filed on Feb. 23, 2021.

(30) Foreign Application Priority Data

Jan. 12, 2021 (KR) .................. 10-2021-0004097

(51) Int. Cl.
*G06F 3/06* (2006.01)
(52) U.S. Cl.
CPC .......... *G06F 3/0626* (2013.01); *G06F 3/0653* (2013.01); *G06F 3/0673* (2013.01)
(58) Field of Classification Search
CPC ..... G06F 3/0626; G06F 3/0653; G06F 3/0673
See application file for complete search history.

(56) References Cited

U.S. PATENT DOCUMENTS 7,506,329 B1 * 3/2009 Boucher ............. G06F 11/3612
717/151
9,134,980 B1 * 9/2015 Cabrera ............. G06F 12/0842
(Continued)

FOREIGN PATENT DOCUMENTS

CN 107 085 548 A 8/2017
CN 108415737 A 8/2018
(Continued)

OTHER PUBLICATIONS

[Online] "Configuring ART", https://www.cnblogs.com/pengdonglin137/articles/5411490.html##_lab2_0_6, Oct. 5, 2020, 7 pages.
(Continued)

*Primary Examiner* — Ryan Bertram
(74) *Attorney, Agent, or Firm* — NIXON & VANDERHYE P.C.

(57) ABSTRACT

According to an embodiment, an electronic device includes: at least one processor and a memory configured to store instructions that can be executed by the processor, wherein the processor may be configured to: monitor information about the storage space of the memory and usage histories of a plurality of objects executed by the processor, determine a target object, of which the compile scheme is to be changed, among the plurality of objects based on at least one of the information and the usage histories; and increase the free storage space of the memory by changing the compile scheme of the target object.

14 Claims, 6 Drawing Sheets

(56) References Cited

U.S. PATENT DOCUMENTS

| | | |
|---|---|---|
| 2005/0140672 A1 | 6/2005 | Hubbell |
| 2006/0236310 A1 | 10/2006 | Domeika et al. |
| 2015/0199138 A1* | 7/2015 | Ramachandran ... G06F 12/0246 |
| | | 711/103 |
| 2021/0072971 A1 | 3/2021 | Jeong et al. |
| 2021/0117168 A1* | 4/2021 | Jeong ........................ G06F 8/41 |
| 2022/0214809 A1* | 7/2022 | Jeong .................... G06F 3/0484 |

FOREIGN PATENT DOCUMENTS

| | | |
|---|---|---|
| JP | 2005301415 A | 10/2005 |
| KR | 20140099166 A | 8/2014 |
| KR | 20150025287 A | 3/2015 |
| KR | 101722672 B1 | 4/2017 |
| KR | 20190045765 A | 5/2019 |
| KR | 20200005009 A | 1/2020 |

OTHER PUBLICATIONS

International Search Report for PCT/KR2021/002226 mailed Sep. 28, 2021, 4 pages.
Written Opinion of the ISA for PCT/KR2021/002226 mailed Sep. 28, 2021, 4 pages.
Extended European Search Report dated May 6, 2024 for EP Application No. 21919792.8.
Ozturk O et al: "Using dynamic compilation for continuing execution under reduced memory availabilty", Design, Automation&Test in Europe Conference&Exhibition, 2009. Date '09, IEEE, Piscataway, NJ, USA, Apr. 20, 2009 (Apr. 20, 2009), pp. 1373-1378.

* cited by examiner

ELECTRONIC DEVICE AND METHOD FOR MANAGING MEMORY OF ELECTRONIC DEVICE

CROSS-REFERENCE TO RELATED APPLICATIONS

This application is a continuation of International Application No. PCT/KR2021/002226 designating the United States, filed on Feb. 23, 2021, in the Korean Intellectual Property Receiving Office and claiming priority to Korean Patent Application No. 10-2021-0004097, filed on Jan. 12, 2021, in the Korean Intellectual Property Office, the disclosures of which are incorporated by reference herein in their entireties.

BACKGROUND

Field

The disclosure relates to an electronic device and a method of managing a memory of an electronic device.

Description of Related Art

When a terminal is short on storage space, the overall performance of the terminal may be degraded depending on the state of a storage space. Thus, a free storage space needs to be pre-emptively secured depending on the state of a storage space, and the performance degradation of a terminal may need to be minimized.

A method of securing a storage space and minimizing performance degradation by changing a compile scheme of an object depending on an object to be executed while monitoring the state of a storage of a terminal may be needed.

Compile artifact files of a package loaded at runtime are generated using a combination of just-in-time (JIT) and ahead-of-time compilation. Runtime performance of a package to be compiled and a size of a compile artifact file may vary depending on a type of a compile-filter, which is one of attributes of compilation.

Performance of a package may vary depending on a compile artifact file, and overall performance of a terminal may be degraded as well when there is a lack of storage space on the terminal.

A free storage space may need to be secured pre-emptively depending on a state of a storage space of a terminal.

SUMMARY

According to an example embodiment, an electronic device may include: at least one processor and a memory configured to store instructions to be executed by the processor, wherein the processor may be configured to: monitor information about a storage space of the memory and usage histories of a plurality of objects executed by the processor, determine a target object of which a compile scheme is to be changed among the plurality of objects based on at least one or two of the information or the usage histories, and increase a free storage space of the memory by changing a compile scheme of the target object.

According to an example embodiment, an electronic device may include: at least one processor and a memory configured to store instructions to be executed by the processor, wherein the processor may be configured to: monitor information about a storage space of the memory based on a plurality of objects executed by the processor, generate an object list including at least some of the plurality of objects, and increase a free storage space of the memory by changing a compile scheme of at least one object included in the object list.

According to an example embodiment, a method of managing a memory of an electronic device may include: monitoring information about a storage space of the memory and usage histories of a plurality of objects executed by the electronic device, determining a target object of which a compile scheme is to be changed among the plurality of objects based on the information and the usage histories, and increasing a free storage space of the memory by changing a compile scheme of the target object.

According to an example embodiment, an electronic device may determine the importance of an object depending on a state of a storage space of a memory and may secure a free storage space of the memory while maintaining performance of the electronic device by changing a compile scheme of the object in stages.

According to an example embodiment, an electronic device may secure a free storage space by reducing a size of a compile artifact file that may not be arbitrarily reduced by a user in a situation where a storage space is insufficient.

According to an example embodiment, an electronic device may enhance a user experience by changing a compile scheme in stages depending on a state of a storage space and pre-emptively securing a free storage space before a user experiences sluggishness.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
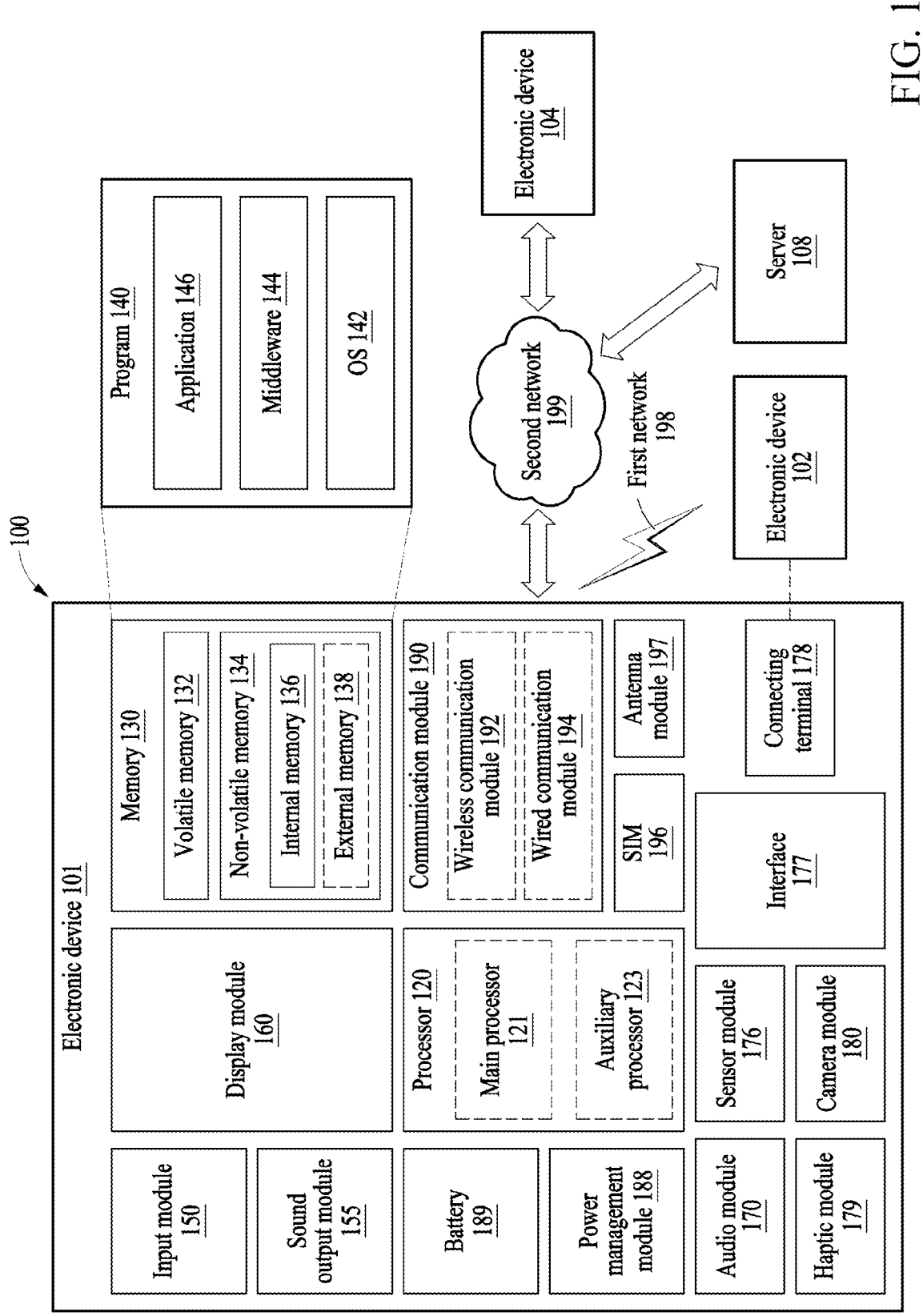
FIG. 1 is a block diagram illustrating an example electronic device in a network environment according to an embodiment.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
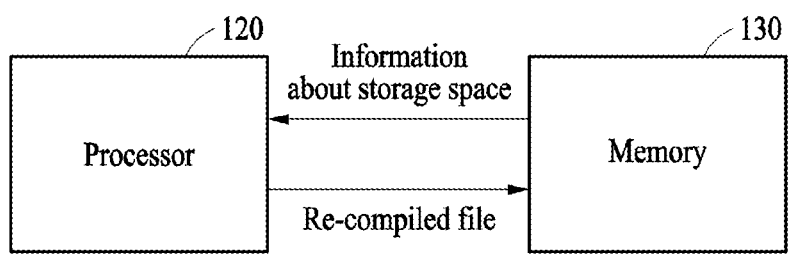
FIG. 2 is a diagram illustrating an example operation of managing a memory of an electronic device according to an embodiment.

FIG. 2 is a diagram illustrating an example operation of managing a memory of an electronic device according to an embodiment.

Referring to FIG. 2, according to an embodiment, an electronic device (e.g., the electronic device 101 of FIG. 1) may include at least one processor (e.g., including processing circuitry) 120 and the memory 130 that stores instructions to be executed by the processor 120.

According to an embodiment, when a storage space of the memory 130 is insufficient, input/output (I/O) processing may slow down and become sluggish depending on the specifications of a storage medium (e.g., the memory 130). In this case, the processor 120 may secure a free storage space of the memory 130 to normalize the overall performance of the electronic device 101. The processor 120 may increase the free storage space by changing a compile scheme of a file that is not visible to a user and performing re-compilation. For example, the processor 120 may decrease a size of a compile artifact file and increase the free storage space by changing a compile scheme of an object. Accordingly, the processor 120 may efficiently secure the free storage space of the memory 130 while minimizing and/or reducing performance degradation of the electronic device 101.

According to an embodiment, the processor 120 may receive information about the storage space from the memory 130 and determine a target object of which a compile scheme is to be changed among a plurality of objects executed by the processor 120. An object may include a service, a package, or a program (e.g., the program 140 of FIG. 1) executed by the processor 120. For example, the object may include an application (e.g., the application 146 of FIG. 1) and a package of the application. The package of the application may include an executable file.

According to an embodiment, the processor 120 may change the compile scheme of the target object and then generate a re-compiled file by performing re-compilation. The processor 120 may increase the free storage space by transmitting the re-compiled file to the memory 130. The processor 120 may transmit the re-compiled file to the memory 130 and increase the free storage space by updating a file that is compiled using an existing method.

According to an embodiment, the processor 120 may monitor information about the storage space of the memory 130 and usage histories of the plurality of objects executed by the processor 120. The information about the storage space may include a ratio of the free storage space to a total storage space of the memory 130 and a size of the free storage space of the memory 130. The usage histories of the plurality of objects may include a period during which the plurality of objects are not used.

According to an embodiment, the processor 120 may determine the target object of which the compile scheme is to be changed among the plurality of objects based on at least one or two of the information about the storage space or the usage histories of the plurality of objects.

According to an embodiment, the processor 120 may determine an object that is not used during a first period to be a first target object among the plurality of objects based on the free storage space of the memory 130. The processor 120 may determine an object that is not used during a second period shorter than the first period to be a second target object. For example, the first period may be 30 days, and the second period may be 15 days.

According to an embodiment, the processor 120 may determine an object having no icon on a display to be the target object among the plurality of objects based on the free storage space of the memory 130.

According to an embodiment, the processor 120 may determine all of the plurality of objects to be the target object based on the free storage space of the memory 130. When the ratio of the free storage space to the total storage space of the memory 130 is less than a ratio threshold (e.g., a second threshold of FIG. 5), the processor 120 may determine all of the plurality of objects to be the target object. When the ratio of the free storage space to the storage space of the memory 130 is less than the ratio threshold, the processor 120 may increase the free storage space by changing compile schemes of all of the plurality of objects. For example, the ratio threshold may be 2%.

According to an embodiment, the processor 120 may generate an object list including at least some of the plurality of objects based on the usage histories of the plurality of objects executed by the processor 120.

According to an embodiment, the processor 120 may increase the free storage space of the memory 130 by changing the compile scheme of the target object. When the free storage space of the memory 130 is less than a size threshold (e.g., a first threshold of FIG. 5), the processor 120 may increase the free storage space by changing compile schemes of objects, which are yet to be changed. The size threshold may be a value that is predetermined (e.g., specified) by the electronic device 101. For example, the size threshold may be 500 megabytes (MB).

According to an embodiment, the processor 120 may increase the free space of the memory 130 by changing a compile scheme of at least one object included in the object list based on the information about the storage space of the memory 130. The processor 120 may generate a first object list to include an object that is not used during the first period among the plurality of objects. The processor 120 may generate a second object list to include an object that is not used during the second period shorter than the first period among the plurality of objects.

According to an embodiment, the processor 120 may generate a third object list to include the object having no icon on the display among the plurality of objects.

According to an embodiment, the processor 120 may downgrade a compile-filter of the target object. The processor 120 may increase the free storage space by re-compiling the target object based on the downgraded compile-filter. The processor 120 may minimize and/or reduce performance degradation by specifying an AP core that performs re-compilation in the background by considering a state of the electronic device 101.

According to an embodiment, the processor 120 may determine an object list of which a compile scheme is to be changed based on the ratio of the free storage space to the total storage space of the memory 130. The processor 120 may increase the free storage space by changing a compile scheme of an object included in the determined object list.

According to an embodiment, the processor 120 may determine whether the electronic device 101 is in use, and when the electronic device 101 is not in use, the processor 120 may increase the free storage space of the memory 130 by changing the compile scheme of the target object. The operation of changing the compile scheme of the target object may be performed in the background.

Figure 3:
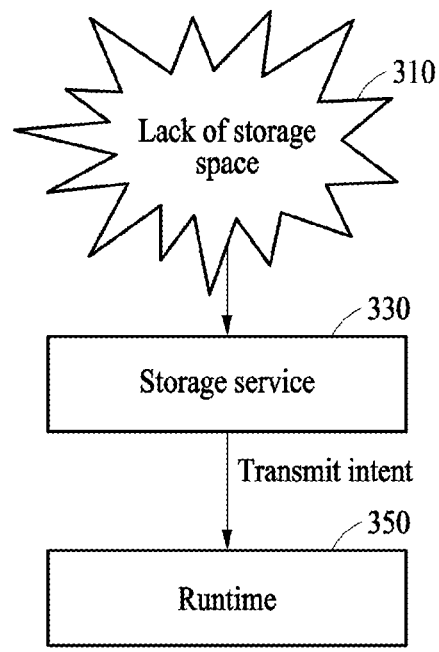
FIG. 3 is a diagram illustrating an example of an operation of monitoring a storage space of a memory according to an embodiment.
Figure 4:
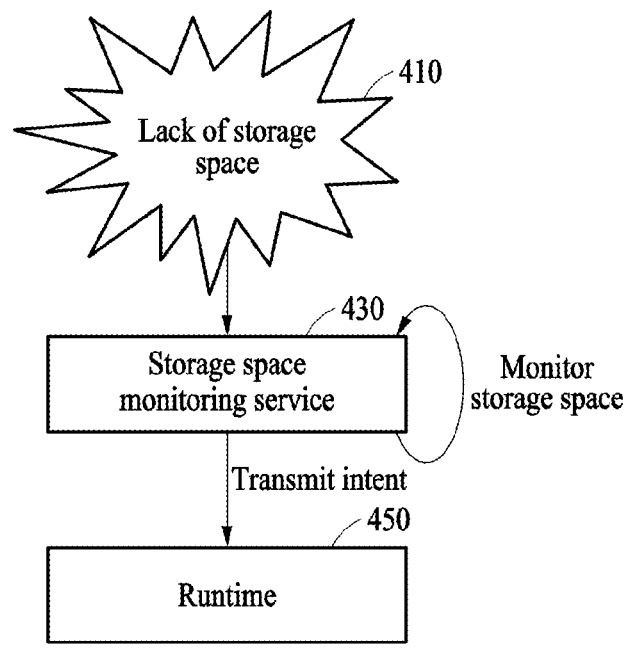
FIG. 4 is a diagram illustrating an example of an operation of monitoring a storage space of a memory according to an embodiment.

FIGS. 3 and 4 are diagrams illustrating examples of an operation of monitoring a storage space of a memory according to an embodiment.

Referring to FIGS. 3 and 4, according to an embodiment, a processor (e.g., the processor 120 of FIG. 1) may monitor information about a storage space of a memory (e.g., the memory 130 of FIG. 1). The processor 120 may monitor a state of a lack of storage space 310 of the memory 130. The processor 120 may monitor the information about the storage space of the memory 130 through a storage service 330.

According to an embodiment, the storage service 330 may detect the state of the lack of storage space by monitoring the memory 130. The storage service 330 may transmit a message (e.g., an intent) to a runtime 350. In computer science, the runtime 350 may refer, for example, to an operation while a computer program is being executed. The runtime 350 may include a runtime library indicating a library or program of basic code used by a predetermined compiler or virtual machine to manage a program written in a computer language. For example, the runtime 350 may include Android runtime (ART), Java virtual machine (JVM), or a Dalvik VM.

According to an embodiment, the runtime 350 may perform compilation using various schemes. The runtime 350 may perform compilation using a just-in-time (JIT) scheme, an ahead-of-time (AOT) scheme, or a hybrid combination of the JIT scheme and the AOT scheme. For example, ART may generate a compile artifact file of an object that is loaded at runtime by performing compilation through a dex2oat tool which is a mixture of the JIT scheme and the AOT scheme.

According to an embodiment, the JIT scheme may refer, for example, to a scheme of performing compilation at an appropriate time. In the JIT scheme, when repetitive execution is detected while an interpreter scheme for a loaded class is being performed, a JIT compiler may be operated to improve an execution speed. In the JIT scheme, native code may be executed very quickly, and since a memory is cached, performance may be maximized and/or improved when repetitive calls are performed. In the JIT scheme, since compilation into native code is performed during runtime, an installation time may be shortened.

According to an embodiment, the AOT scheme may refer, for example, to a scheme of converting source code into native code, storing the native code at a time of installing an object, and reading the native code when executing the object. In the AOT scheme, since the code is converted when the object is being installed, it may be possible to improve a speed by reducing a time for which the object is executed for the first time, compared to a scheme of converting code at a time of executing an object for the first time.

According to an embodiment, the processor 120 may perform compilation using the hybrid combination of the JIT scheme and the AOT scheme. The processor 120 may install the object for the first time using the JIT scheme to reduce the installation time and a required storage capacity and may store a profile according to a user pattern through the interpreter. After storing the profile, an AOT background service daemon is started by a job scheduler, and the processor 120 may generate code (e.g., an oat file) that is compiled through compilation in the background when a predetermined condition is satisfied. When driving the object, the processor 120 may directly use code that is compiled in a compiled ART runtime without going through the interpreter.

According to an embodiment, the processor 120 may monitor a state of a lack of storage space 410. The processor 120 may monitor the storage space of the memory 130 through a storage space monitoring service 430. The storage space monitoring service 430 may monitor the state of the lack of storage space 410. The storage space monitoring service 430 may transmit a message (e.g., an intent) to a runtime 450.

Figure 5:
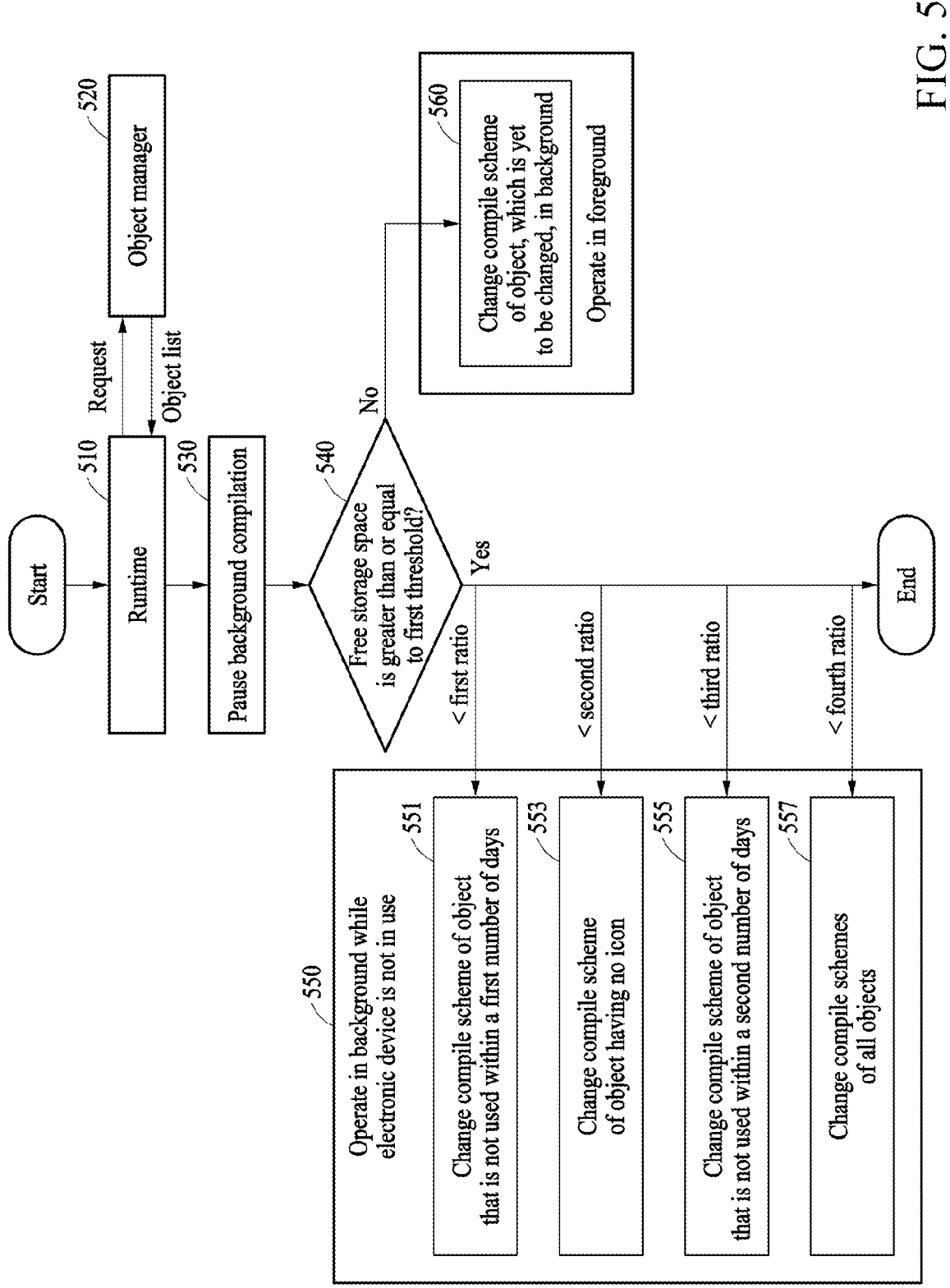
FIG. 5 is a flowchart illustrating an example operation of managing a memory of an electronic device according to an embodiment.

FIG. 5 is a flowchart illustrating an example operation of managing a memory of an electronic device according to an embodiment. Operations 510 to 560 of FIG. 5 may be performed sequentially, but may not necessarily be performed sequentially. For example, operations 510 to 560 may be performed in different orders, and at least two operations may be performed in parallel.

Referring to FIG. 5, according to an embodiment, a processor (e.g., the processor 120 of FIG. 1) may monitor information about a storage space of a memory (e.g., the memory 130 of FIG. 1) and usage histories of a plurality of objects executed by the processor 120.

According to an embodiment, the processor 120 may monitor an object through a runtime 510 and an object manager 520. The runtime 510 may transmit a request for an object list to the object manager 520. The object manager 520 may generate an object list of objects that need to be optimized by monitoring the plurality of objects and transmit the generated object list to the runtime 510.

According to an embodiment, the object manager 520 may generate a first object list to include an object that is not used during a first period among the plurality of objects and generate a second object list to include an object that is not used during a second period shorter than the first period among the plurality of objects. For example, the first period may be 30 days, and the second period may be 15 days.

According to an embodiment, the object manager 520 may generate a third object list to include an object having no icon on a display among the plurality of objects.

According to an embodiment, the processor 120 may monitor the information about the storage space of the memory 130. The processor 120 may detect a state of a lack of storage space through monitoring. When the state of the lack of storage space is detected, the processor 120 may pause background compilation, in operation 530. For example, the processor 120 may pause background dexopt (background dex optimization). The processor 120 may pause the background dexopt until it is ensured that a free storage space of the memory 130 reaches a predetermined storage capacity.

According to an embodiment, the background dexopt may refer, for example, to a process of compiling a dex file that is in an Android application package (APK) in the background using a dex2oat tool based on a profile that is generated as an electronic device (e.g., the electronic device 101 of FIG. 1) is used. The processor 120 may regenerate a compile artifact file by performing compilation through the background dexopt.

According to an embodiment, the compile artifact file may include .vdex, .odex, .oat, or .art files. The .vdex file may include uncompressed code of the APK and additional metadata. The .odex and/or .oat files may include AOT compiled code for a scheme defined in the APK. The .art file may include internal representations of some character strings and classes listed in .dex of the APK. For example, the processor 120 may regenerate the .oat file or the .art file through the background dexopt.

According to an embodiment, performance of an object may vary depending on a compiled scheme or class. The background dexopt may be executed by a job scheduler.

According to an embodiment, the processor 120 may determine whether the free storage space is greater than or equal to a first threshold (e.g., 500 MB) in operation 540. For example, and without limitation, the processor 120 may determine whether the free storage space is greater than or equal to 500 MB.

According to an embodiment, the processor 120 may change a compile scheme of an object of an object list when the free storage space is greater than or equal to the first threshold (yes in operation 540), in operation 550. The processor 120 may change the compile scheme of the object included in the object list in the background while the electronic device 101 is not in use.

According to an embodiment, the processor 120 may modify the compile scheme of the object in stages based on the generated object list when the free space is greater than or equal to the first threshold. The processor 120 may downgrade a compile-filter of a target object of which the compile scheme is to be changed and increase the free storage space by re-compiling the target object based on the downgraded compile-filter. For example, the processor 120 may increase a free storage space for an object by, e.g., 100 to 200 MB of free storage, by downgrading the compile-filter and performing the re-compilation.

According to an embodiment, the processor 120 may compile a dex file using the dex2oat tool in a runtime (e.g., ART). The processor 120 may change the compile scheme by changing the compile-filter (or a compile-filter option). Types of compile-filters may be shown in Table 1.

TABLE 1

| Compile-filter | Description |
| --- | --- |
| run-from-apk | execute an object using a dex file in the APK |
| extract | only decompress the dex file in the APK and copy it to a predetermined path |
| verify | only run dex code verification |
| quicken | run dex code verification and optimize some dex instructions |
| speed-profile | run dex code verification and AOT-compile a scheme in a profile |
| speed | run dex code verification and AOT-compile all schemes |

According to an embodiment, Table 1 may list the compile-filters in order of downgraded to upgraded compile-filters. In other words, downgrading a compile-filter may refer, for example, to a type of a compile-filter being changed to a compile-filter listed in a relatively upper row in Table 1.

According to an embodiment, depending on a type of a compile-filter, runtime performance of an object that is compiled through the dex2oat tool may vary and a size of a generated compile artifact file (e.g., the .odex file or the .art file) may vary. The size of the compile artifact file may vary depending on a type of the object, and the size may range from 0 MB to hundreds of MB. The processor 120 may prevent and/or reduce performance degradation of the electronic device 101 due to the lack of storage space of the memory 130 by changing the type of the compile-filter.

According to an embodiment, the processor 120 may minimize and/or reduce performance degradation by generating an object list based on importance of the object and by changing the type of the compile-filter in stages according to a size of the free storage space of the memory 130 to secure the free storage space.

According to an embodiment, the processor 120 may change the compile scheme by downgrading the compile-filter. The processor 120 may regenerate the compile artifact file by downgrading the compile-filter and performing re-compilation. Since the regenerated compile artifact file has a smaller capacity than the compile artifact file before re-compilation, the free storage space of the memory 130 may increase.

According to an embodiment, the processor 120 may change compile schemes of objects included in different object lists according to a ratio of the free storage space to a total storage space of the memory 130. A compile scheme of an object included in an object list may be changed in the background while the electronic device 101 is not in use.

According to an embodiment, when the ratio of the free storage space to the total storage space of the memory 130 is less than a first ratio, the processor 120 may change a compile scheme of an object included in a first object list. For example, when the ratio of the free storage space to the total storage space is less than a specified ratio (e.g., 5%), the processor 120 may change a compile scheme of an object that is not used within a first number of days (e.g., 30 days), in operation 551.

According to an embodiment, when the ratio of the free storage space to the total storage space of the memory 130 is less than a second ratio, the processor 120 may change a compile scheme of an object included in a third object list. For example, when the ratio of the free storage space to the total storage space is less than a specified ratio (e.g., 4%), the processor 120 may change a compile scheme of an object having no icon, in operation 553.

According to an embodiment, when the ratio of the free storage space to the total storage space of the memory 130 is less than a third ratio, the processor 120 may change a compile scheme of an object included in a second object list. For example, when the ratio of the free storage space to the total storage space is less than a specified ratio (e.g., 3%), the processor 120 may change a compile scheme of an object that is not used within a second number of days (e.g., 15 days), in operation 555.

According to an embodiment, when the ratio of the free storage space to the total storage space of the memory 130 is less than a fourth ratio (e.g., the second threshold of FIG. 2), the processor 120 may compile schemes of all objects. All objects may include an object that is not included in the first, second, and third object lists. For example, when the ratio of the free storage space to the total storage space is less than 2%, the processor 120 may change the compile schemes of all objects (or the object that is not included in the first, second, and third object lists), in operation 557.

According to an embodiment, when the free storage space of the memory 130 is less than the first threshold, the processor 120 may change a compile scheme of an object, which is yet to be changed, in the background, in operation 560. When the free storage space of the memory 130 is less than the first threshold, the processor 120 may increase the free storage space by changing compile schemes of objects, which are yet to be changed. The processor 120 may perform an operation of changing the compile scheme of the object, wherein the compile scheme is yet to be changed, in the foreground.

According to an embodiment, the processor 120 may secure the free storage space of the memory 130 by changing compile schemes of objects of an object list in stages according to a state of the free storage space of the memory 130 without a separate control by a user of the electronic device 101. The processor 120 may delay a time point at which a compile scheme for a frequently used object is downgraded to prevent and/or reduce performance degradation of an object, which is frequently used by the user, and improve a user experience.

Figure 6:
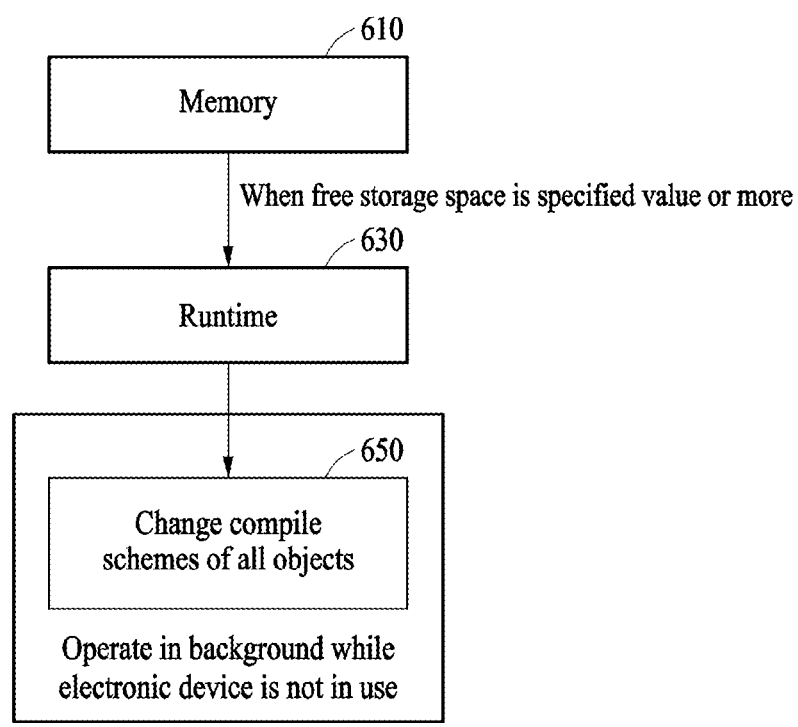
FIG. 6 is a diagram illustrating an example operation of improving electronic device performance of an electronic device according to an embodiment.

FIG. 6 is a diagram illustrating an example operation of improving electronic device performance of an electronic device according to an embodiment.

Referring to FIG. 6, according to an embodiment, a processor (e.g., the processor 120 of FIG. 1) may restore a compile scheme of an object, wherein the compile scheme has been changed, when a free storage space of a memory 610 (e.g., the memory 130 of FIG. 1) reaches a predetermined (e.g., specified) value or more. The processor 120 may restore the compile scheme when a ratio of the free storage space to a total storage space of the memory 610 reaches the predetermined value or more.

According to an embodiment, a runtime 630 may receive information about the free storage space from the memory 610. The runtime 630 may determine whether the ratio of the free storage space to the total storage space of the memory 610 is greater than or equal to the predetermined (e.g., specified) value. For example, and without limitation, the predetermined value may be 10%.

According to an embodiment, the processor 120 may change or restore the compile scheme of the object when the ratio of the free storage space to the total storage space reaches the predetermined value or more. For example, when the ratio of the free storage space to the total storage space of the memory 610 is a specified value (e.g., 10%) or more, the processor 120 may change (or restore) compile schemes of all objects through the runtime 630, in operation 650. The restoration of the compile scheme may be performed in the background while an electronic device (e.g., the electronic device 101 of FIG. 1) is not in use.

According to an embodiment, when the ratio of the free storage space to the total storage space of the memory 610 reaches the predetermined value or more, the processor 120 may re-compile a downgraded compile-filter by upgrading the downgraded compile-filter. Table 2 illustrates an example size of a compile artifact file according to a type of a compile-filter.

TABLE 2

| Type of compile-filter | File type | Size (MB) |
|---|---|---|
| speed profile | total (.art) | 122.43 |
| | total(.odex) | 671.19 |
| | total(.vdex) | 3094.10 |
| | Sum | 3887.71 |
| | | (about 3.8 gigabytes (GB)) |
| verify | total(.odex) | 72.34 |
| | total(.vdex) | 2922.24 |
| | Sum | 2994.58 |
| | | (about 2.9 G) |

According to an embodiment, the processor 120 may improve the performance of the object by restoring the type of the compile-filter from 'verify' to 'speed profile' and performing re-compilation. Table 3 illustrates examples of entry time and a size of an available storage space for the object when compilation is performed with 'speed profile,' and Table 4 illustrates an example entry time and a size of an available storage space for the object when compilation is performed with 'verify.'

TABLE 3

| Item | |
|---|---|
| Re-entry count | 25.2 |
| Average entry speed | 401 ms |
| Average available memory | 3,101 MB |
| Average free memory | 663 MB |
| Average cached memory | 2,437 MB |
| Average swapused memory | 1,039 MB |

TABLE 4

| Item | |
|---|---|
| Re-entry count | 25.1 |
| Average entry speed | 435 ms |
| Average available memory | 3,157 MB |
| Average free memory | 674 MB |
| Average cached memory | 2,484 MB |
| Average swapused memory | 988 MB |

According to an embodiment, when the free storage space of the memory 610 is insufficient, the processor 120 may prevent and/or reduce the electronic device 101 from becoming sluggish by downgrading the compile-filter, and when the free storage space is sufficient, the processor 120 may restore the compile-filter, and thus, performance of the object may be improved and the performance of the electronic device 101 and the object may be stably secured.

Figure 7:
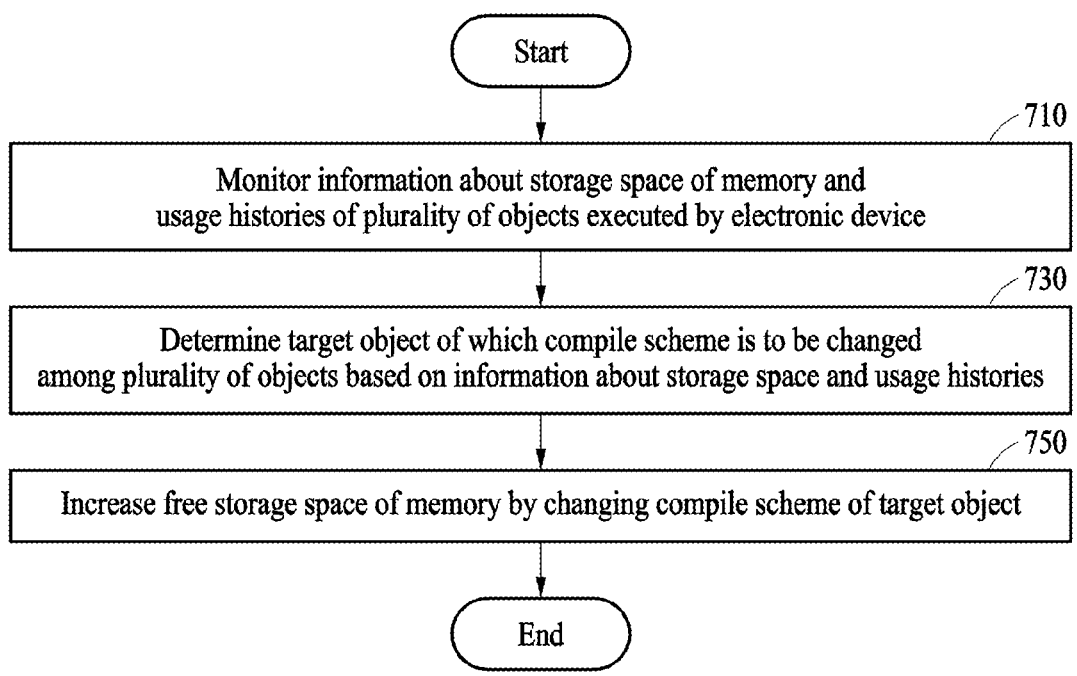
FIG. 7 is a flowchart illustrating an example operation of an electronic device according to an embodiment.

FIG. 7 is a flowchart illustrating an example operation of an electronic device according to an embodiment. Operations 710 to 750 of FIG. 7 may be performed sequentially, but may not necessarily be performed sequentially. For example, operations 710 to 750 may be performed in different orders, and at least two operations may be performed in parallel.

Referring to FIG. 7, according to an embodiment, a processor (e.g., the processor 120 of FIG. 1) may monitor information about a storage space of a memory (e.g., the memory 130 of FIG. 1) and usage histories of a plurality of objects executed by an electronic device, in operation 710.

The information about the storage space may include a ratio of a free storage space to a total storage space of the memory 130 and a size of the free storage space of the memory 130. The usage histories of the plurality of objects may include a period during which the plurality of objects is not used.

According to an embodiment, the processor 120 may determine a target object of which a compile scheme is to be changed among the plurality of objects based on the information about the storage space and the usage histories of the plurality of objects, in operation 730. The processor 120 may determine an object that is not used during a first period among the plurality of objects to be a first target object and determine an object that is not used during a second period shorter than the first period to be a second target object based on the free storage space of the memory 130. The processor 120 may determine an object having no icon on a display among the plurality of objects to be the target object based on the free storage space of the memory 130. The processor 120 may determine all of the plurality of objects to be the target object based on the free storage space of the memory 130. The processor 120 may determine all of the plurality of objects to be the target object when the ratio of the free storage space to the storage space of the memory 130 is less than a second threshold.

According to an embodiment, the processor 120 may generate an object list including at least some of the plurality of objects based on the usage histories of the plurality of objects executed by the processor 120. The processor 120 may generate a first object list to include an object that is not used during the first period among the plurality of objects and generate a second object list to include an object that is not used during the second period shorter than the first period among the plurality of objects. The processor 120 may generate a third object list to include the object having no icon on the display among the plurality of objects.

According to an embodiment, the processor 120 may increase the free space of the memory 130 by changing a compile scheme of the target object, in operation 750. The processor 120 may increase the free storage space by downgrading a compile-filter of the target object and re-compiling the target object based on the downgraded compile-filter.

According to an embodiment, the processor 120 may determine an object list of which a compile scheme is to be changed based on the ratio of the free storage space to the total storage space of the memory 130 and increase the free storage space by changing a compile scheme of an object included in the determined object list.

According to an embodiment, the processor 120 may determine whether the electronic device is in use, and when the electronic device is not in use, the processor 120 may increase the free storage space by changing the compile scheme of the target object. The operation of changing the compile scheme of the target object may be performed in the background.

According to an embodiment, when the free storage space of the memory 130 is less than a first threshold, the processor 120 may increase the free storage space by changing compile schemes of objects, wherein the compile schemes are yet to be changed.

According to an example embodiment, an electronic device (e.g., the electronic device 101 of FIG. 1) may include: at least one processor (e.g., the processor 120 of FIG. 1) and a memory (e.g., the memory 130 of FIG. 1) configured to store instructions to be executed by the processor, wherein the processor may be configured to: monitor information about a storage space of the memory and usage histories of a plurality of objects executed by the processor, determine a target object of which a compile scheme is to be changed among the plurality of objects based on at least one or both of the information or the usage histories, and increase a free storage space of the memory by changing a compile scheme of the target object.

According to an example embodiment, the information may include a ratio of a free storage space to a total storage space of the memory and a size of the free storage space of the memory, and the usage histories may include a period during which the plurality of objects are not used.

According to an example embodiment, based on the free storage space of the memory being less than a first threshold, the processor may be configured to increase the free storage space by changing compile schemes of objects, wherein the compile schemes are yet to be changed.

According to an example embodiment, the processor may be configured to: determine an object not used during a first period among the plurality of objects to be a first target object based on the free storage space of the memory; and determine an object not used during a second period shorter than the first period to be a second target object.

According to an example embodiment, the processor may be configured to determine an object having no icon on a display among the plurality of objects to be the target object based on the free storage space of the memory.

According to an example embodiment, the processor may be configured to determine all of the plurality of objects to be the target object based on the free storage space of the memory.

According to an example embodiment, based on the ratio of the free storage space to the storage space of the memory being less than a second threshold, the processor may determine all of the plurality of objects to be the target object.

According to an example embodiment, the processor may be configured to: increase the free storage space by downgrading a compile-filter of the target object; and re-compile the target object based on the downgraded compile-filter.

According to an example embodiment, the processor may be configured to: determine whether the electronic device is in use, and based on the electronic device not being in use, the processor may be configured to increase the free storage space by changing the compile scheme of the target object.

According to an example embodiment, the changing the compile scheme of the target object may be performed in the background.

According to an example embodiment, an electronic device (e.g., the electronic device 101 of FIG. 1) may include: at least one processor (e.g., the processor 120 of FIG. 1) and a memory (e.g., the memory 130 of FIG. 1) configured to store instructions to be executed by the processor, wherein the processor may be configured to: monitor information about a storage space of the memory based on usage histories of a plurality of objects executed by the processor, generate an object list including at least some of the plurality of objects, and increase a free storage space of the memory by changing a compile scheme of at least one object included in the object list based on the information.

According to an example embodiment, the information may include a ratio of the free storage space to a total storage space of the memory and a size of the free storage space of the memory, and the usage histories may include a period during which the plurality of objects are not used.

According to an example embodiment, based on the free storage space of the memory being less than a first threshold, the processor may be configured to increase the free storage space by changing compile schemes of objects, wherein the compile schemes are yet to be changed.

According to an example embodiment, the processor may be configured to: generate a first object list to include an object not used during a first period among the plurality of objects; and generate a second object list to include an object not used during a second period shorter than the first period among the plurality of objects.

According to an example embodiment, the processor may be configured to generate a third object list to include an object having no icon on a display among the plurality of objects.

According to an example embodiment, the processor may be configured to: determine an object list of which the compile scheme is to be changed based on a ratio of the free storage space to the total storage space of the memory; and increase the free storage space by changing a compile scheme of an object included in the determined object list.

According to an example embodiment, based on the ratio being less than a second threshold, the processor may be configured to increase the free storage space by changing compile schemes of all of the plurality of objects.

According to an example embodiment, the processor may be configured to: downgrade a compile-filter of the at least one object; and increase the free storage space by re-compiling the at least one object based on the downgraded compile-filter.

According to an example embodiment, the processor may be configured to: determine whether the electronic device is in use; and based on the electronic device not being in use the processor may be configured to increase the free storage space by changing a compile scheme of the at least one object.

According to an example embodiment, a method of managing a memory (e.g., the memory 130 of FIG. 1) of an electronic device (e.g., the electronic device 101 of FIG. 1) may include: monitoring information about a storage space of the memory and usage histories of a plurality of objects executed by the electronic device, determining a target object of which a compile scheme is to be changed among the plurality of objects based on at least one of the information and the usage histories, and increasing a free storage space of the memory by changing a compile scheme of the target object.

The electronic device according to an embodiment may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that an embodiment of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$," "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to an example embodiment, it will be understood that the example embodiment is intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor including processing circuitry; and
   a memory configured to store instructions to be executed by the processor,
   wherein the processor is configured, when executing the instructions, to:
   monitor information about a storage space of the memory and usage histories of a plurality of objects executed by the processor; and
   determine a target object of which a compile scheme is to be changed among the plurality of objects based on at least one of the information or the usage histories;
   wherein the information comprises a ratio of a free storage space to a total storage space of the memory and a size of the free storage space of the memory;
   determine an object having no icon on a display among the plurality of objects to be the target object based on the free storage space of the memory; and
   change the compile scheme of the target object to increase a free storage space of the memory.

2. The electronic device of claim 1, wherein
   the usage histories comprise a period during which the plurality of objects are not used.

3. The electronic device of claim 1, wherein the processor is configured to, based on the free storage space of the memory being less than a first threshold, increase the free storage space by changing compile schemes of objects, wherein the compile schemes are yet to be changed.

4. The electronic device of claim 1, wherein the processor is configured to:
   determine an object not used during a first period among the plurality of objects to be a first target object based on the free storage space of the memory; and
   determine an object not used during a second period shorter than the first period to be a second target object.

5. The electronic device of claim 4, wherein the processor is configured to determine all of the plurality of objects to be the target object based on the free storage space of the memory.

6. The electronic device of claim 5, wherein the processor is configured to, based on the ratio of the free storage space to the storage space of the memory being less than a second threshold, determine all of the plurality of objects to be the target object.

7. The electronic device of claim 1, wherein the processor is configured to:
   downgrade a compile-filter of the target object; and
   increase the free storage space by re-compiling the target object based on the downgraded compile-filter.

8. The electronic device of claim 1, wherein the processor is configured to:
   determine whether the electronic device is in use; and
   based on the electronic device not being in use, increase the free storage space by changing a compile scheme of the target object.

9. The electronic device of claim 1, wherein changing a compile scheme of the target object is configured to be performed in background.

10. An electronic device comprising:
    at least one processor including processing circuitry; and
    a memory configured to store instructions to be executed by the processor,
    wherein the processor is configured, when executing the instructions, to:
    monitor a storage space of the memory;
    based on usage histories of a plurality of objects executed by the processor, generate an object list comprising at least some of the plurality of objects and an object having no icon on a display among the plurality of objects; and
    change the compile scheme of at least one object comprised in the object list to increase a free storage space of the memory.

11. The electronic device of claim 10, wherein the processor is configured to, based on the free storage space of the memory being less than a first threshold, increase the free storage space by changing compile schemes of objects, wherein the compile schemes are yet to be changed.

12. The electronic device of claim 10, wherein the processor is configured to:
    generate a first object list to include an object not used during a first period among the plurality of objects; and
    generate a second object list to include an object not used during a second period shorter than the first period among the plurality of objects.

13. The electronic device of claim 10, wherein the processor is configured to:
    determine an object list of which the compile scheme is to be changed based on a ratio of the free storage space to a total storage space of the memory; and
    increase the free storage space by changing a compile scheme of an object included in the determined object list.

14. A method for managing a memory of an electronic device comprising:
    monitoring information about a storage space of the memory and usage histories of a plurality of objects executed by the electronic device; and
    determining a target object of which a compile scheme is to be changed among the plurality of objects based on at least one of the information or the usage histories;
    wherein the information comprises a ratio of a free storage space to a total storage space of the memory and a size of the free storage space of the memory;
    determining an object having no icon on a display among the plurality of objects to be the target object based on the free storage space of the memory; and
    changing the compile scheme of the target object to increasing a free storage space of the memory.

* * * * *